(No Model.)

A. T. MATTHEWS.
PIPE THIMBLE.

No. 379,482. Patented Mar. 13, 1888.

Witnesses:
James F. DuHamel
Arthur Ashley

Inventor:
Ambrose T. Matthews,
by Dodge & Sons,
Attys.

UNITED STATES PATENT OFFICE.

AMBROSE T. MATTHEWS, OF WORCESTER, MASSACHUSETTS, ASSIGNOR TO THE WORCESTER FERRULE COMPANY, OF SAME PLACE.

PIPE-THIMBLE.

SPECIFICATION forming part of Letters Patent No. 379,482, dated March 13, 1888.

Application filed October 11, 1887. Serial No. 252,053. (No model.)

*To all whom it may concern:*

Be it known that I, AMBROSE T. MATTHEWS, of Worcester, in the State of Massachusetts, have invented certain new and useful Improvements in Pipe-Thimbles, of which the following is a specification.

My invention relates to thimbles for use in connection with the pipes employed for steam-heating purposes; and it consists in a novel construction of said thimbles, as hereinafter set forth and claimed, whereby they are adapted to hold themselves in proper position.

Figure 1:
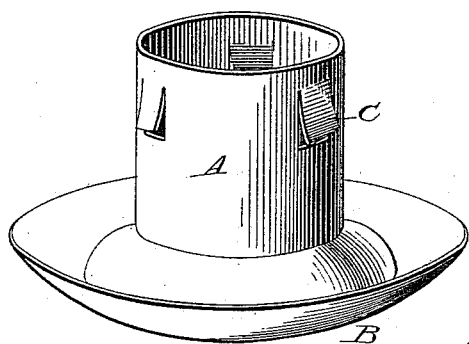
Figure 2:
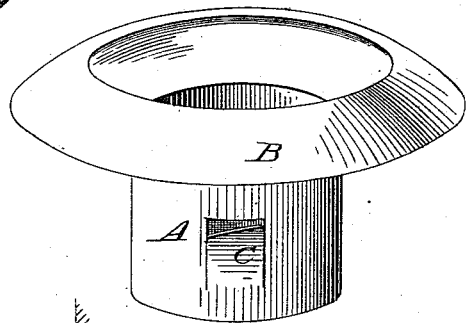
Figure 3:
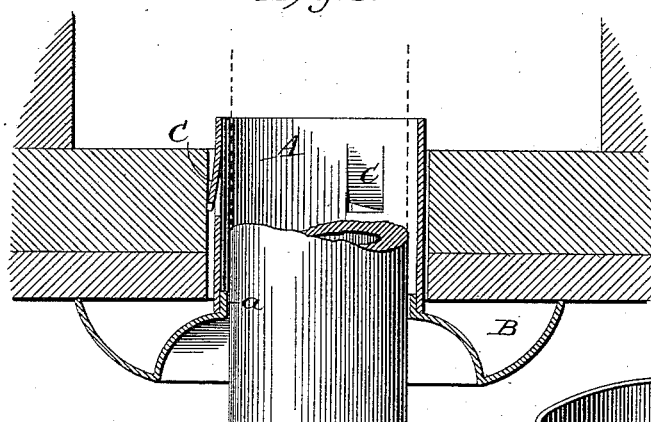

In the drawings, Figures 1 and 2 are perspective views of my improved thimble; Fig. 3, a sectional view showing the thimble in place, and Fig. 4 a view illustrating a slight modification.

In fitting out buildings with steam-heating apparatus it is customary to incase or surround the pipes with thimbles where they pass through walls or floors, for the twofold purpose of preventing the hot pipes from coming into direct contact with the wood-work and to give a neat and finished appearance to the work. These thimbles have consisted, mainly, of a cylindrical body and an ornamental collar of somewhat larger diameter than the main body, and have been secured in position upon the pipe close up to the wall or ceiling, either by means of a set-screw or by means of inwardly and upwardly projecting fingers. The first of these plans is objectionable, because when the screw is made to bear upon the pipe it causes the opposite face of the thimble to also bear upon the pipe, and thereby prevents the latter from passing centrally through the thimble. Another objection to this arrangement is that when the pipe expands or contracts it carries the thimble with it, and consequently causes the latter to move close to or away from the wall or ceiling, and of course in the latter case exposing the opening through which the pipe passes. The other thimble to which I have referred is also open to precisely the same objections, and furthermore, where vertical pipes are employed, it is liable to be released or detached from the pipe and fall to the floor.

To overcome these difficulties, or, in other words, to provide a thimble that shall in all times remain in position to cover the hole or opening through which the pipe passes, and shall at the same time permit movement of the pipe due to expansion and contraction, is the object of my invention.

Referring again to the drawings, A indicates the cylindrical body or shell of the thimble, and B the collar secured to one end of the body A, the two parts being soldered, riveted, or otherwise fastened together. These parts may be made of cast or sheet metal; but I prefer the latter, because of the lightness and ease of manufacture.

It will be noticed that the collar B is provided with a short neck or flange, $a$, which fits within the end of the cylindrical body A. This neck or flange serves to stiffen the body or shell A, and also prevents the hot pipe from coming into contact with the body A. While I prefer to make the thimble with this neck, it is obvious that it may be omitted; or, if used, it might be placed outside of the shell or body, instead of inside, as shown.

Upon the outer face of the body A is a number of spring-arms, C, which will advisably be formed integral with the body or shell A. The arms C will preferably be formed by cutting slots in the body A, so as to form tongues or arms, which will then be turned outward, as shown in all the figures. These arms C project downwardly and outwardly from the cylindrical body A, and the lower edge of which will advisably, though not necessarily, be cut on an incline or bevel, as clearly shown.

The inclination or bevel of the lower edge of the arms C is from left to right, as shown in Figs. 1 and 3, and is for the purpose of aiding the insertion and removal of the thimble. Now, when the thimble is inserted into the opening, the arms C, which are slightly elastic or yielding, engage with the walls of the opening with sufficient force to retain the thimble in place.

The lower ends of the arms C may or may not become embedded in the walls of the opening; but in any event they will bear against the same with sufficient force to hold the thimble in place. By turning the thimble slightly to the right the inclined, slanting, or beveled lower edges of the arms C, riding in contact with the walls of the opening, will serve to draw the thimble farther into the opening and cause the collar B to fit snugly against the ceiling. The form of these arms prevents in a great measure the accidental dropping of the thimble. In order to remove the thimble it will only be necessary to turn it to the left, the inclined edges of the arms acting somewhat like a screw to force the thimble out.

While, as I have before stated, the arms C will preferably be made integral with the body or shell A, it is obvious that they may be made separate therefrom and riveted thereto. The number of arms C employed is likewise a matter capable of considerable variation, though three will be found the best number.

Figure 4:
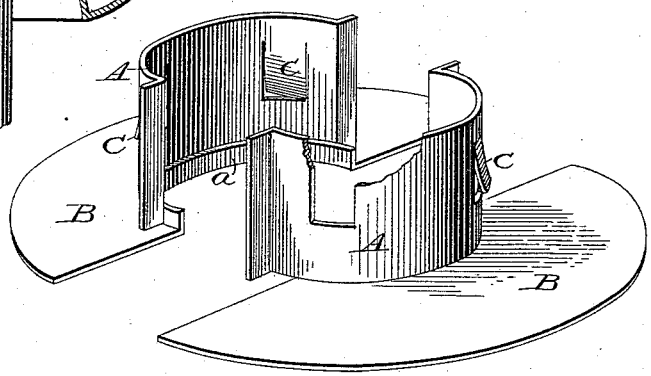

In some cases it becomes necessary to put the thimble in position after the pipes have been put in proper position, and it is of course necessary that the thimble be divided into two or more parts. In all ordinary cases it will be found sufficient to divide it into two parts only, as shown in Fig. 4; but I do not wish to limit myself to that precise construction.

Owing to the fact that the pressure upon the thimble would tend to crush the divided shell, it is only necessary that the vertical edges of the parts of the shell be so constructed as to afford a good square bearing against each other. Such an arrangement is shown in Fig. 4, in which it will be seen that the edges of the shell are turned outward radially, so as to form a flat bearing-face. These edges should not be turned outward so far as to project beyond the arms C, as they would prevent the turning of the thimble.

A thimble constructed in accordance with my invention is cheap to manufacture, can be applied by any one, and will retain itself in proper position regardless of the expansion and contraction of the pipe.

Having thus described my invention, what I claim is—

1. A pipe-thimble comprising shell or body A, collar B, and a spring-arm, C, projecting downwardly and outwardly from the shell or body, all substantially as shown.

2. A pipe-thimble comprising shell or body A, collar B, and a spring-arm, C, projecting from the shell or body and having its lower edge beveled or inclined, for the purpose set forth.

3. A pipe-thimble comprising a shell or body, A, collar B, and a spring-arm, C, formed integral with the shell or body and projecting outwardly and downwardly toward the collar.

4. A divided pipe-thimble provided with outwardly and downwardly projecting arms, substantially as shown.

5. In combination with divided collar B, divided shell A, the parts of the latter being each provided with an arm, as C, and with a flat bearing face or flange at the point of meeting.

In witness whereof I hereunto set my hand in the presence of two witnesses.

AMBROSE T. MATTHEWS.

Witnesses:
 WM. E. LEWIS,
 ALVAN S. PRATT.